United States Patent [19]

Veenhof

[11] 4,265,358

[45] May 5, 1981

[54] CONVEYOR BELT CLEANER AND SCRAPER BLADE THEREFOR

[76] Inventor: Willem D. Veenhof, 3 Rambler Rd., Kensington, Johannesburg, Transvaal Province, South Africa

[21] Appl. No.: 46,225

[22] Filed: Jun. 7, 1979

[30] Foreign Application Priority Data

Jun. 15, 1978 [ZA] South Africa .................. 78/3442

[51] Int. Cl.³ ............................................. B65G 45/00
[52] U.S. Cl. .................................... 198/499; 15/256.5
[58] Field of Search ............................. 198/497–499, 198/367, 635, 637, 323, 324, 325; 74/230; 15/256.5, 256.51, 256.52, 256.6, 121, 250.11, 250.42

[56] References Cited

U.S. PATENT DOCUMENTS 3,952,863   4/1976   Schattauer ..................... 198/499

FOREIGN PATENT DOCUMENTS 2709714   9/1978   Fed. Rep. of Germany ........... 198/497
2108025   5/1972   France ............................ 198/323

*Primary Examiner*—Robert B. Reeves
*Assistant Examiner*—Douglas D. Watts
*Attorney, Agent, or Firm*—Stevens, Davis, Miller & Mosher

[57] ABSTRACT

A conveyor belt cleaner comprising at least one scraper blade adapted to clean the surface of a conveyor belt as a result of its being urged towards said conveyor belt surface, the conveyor belt cleaner being characterized in that the scraper blade extends transversely with respect to the belt and is rotatable about an effective axis extending transversely with respect to the belt so that the scraper blade can assume either of two terminal positions in both of which the region of the belt moving towards the scraper blade makes an acute angle with the blade.

7 Claims, 3 Drawing Figures

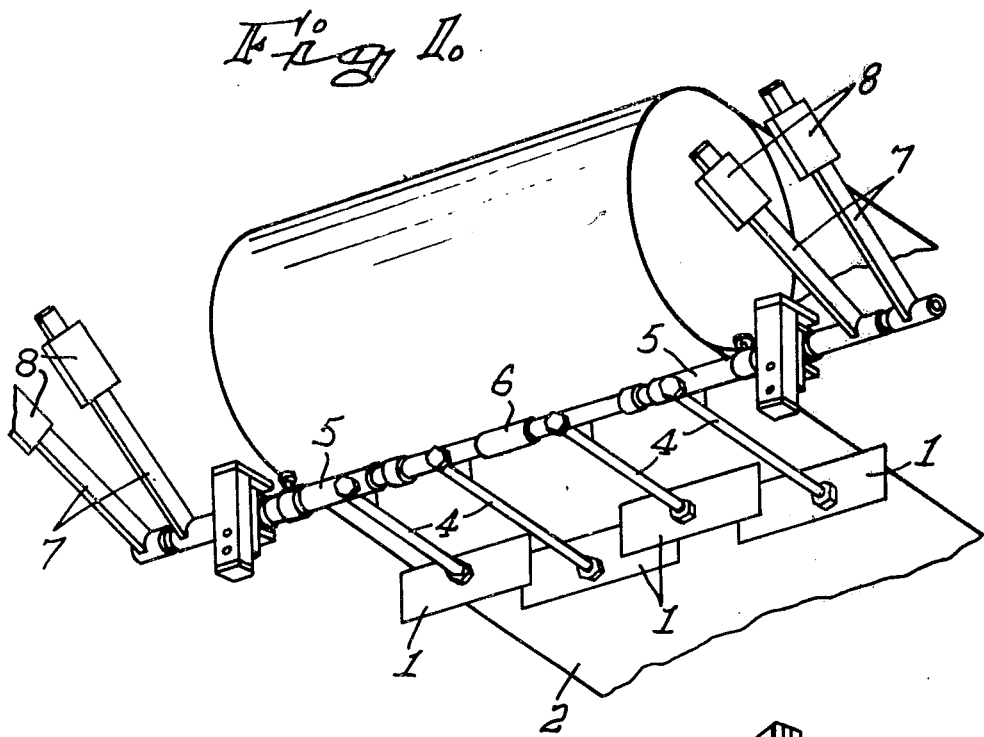
Fig 1.
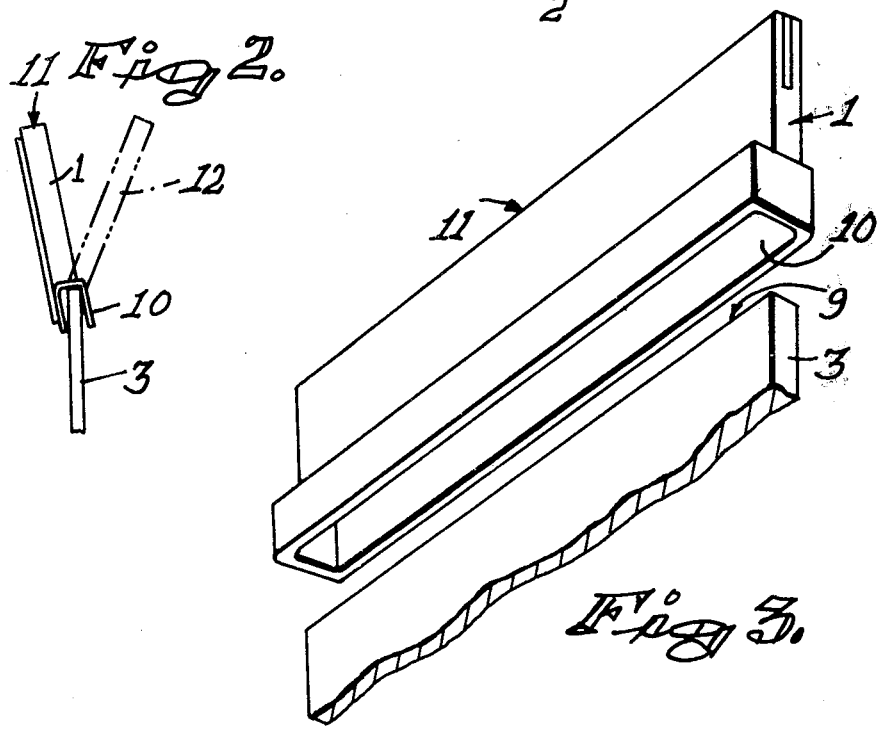
Fig 2.
Fig 3.

CONVEYOR BELT CLEANER AND SCRAPER BLADE THEREFOR

This invention relates to an improved conveyor belt cleaner and more particularly but not exclusively to blades for use in such cleaner to scrape material adhering to a belt conveyor from the belt on the return path thereof.

Applicant believes that the optimum safety of a conveyor belt cleaner using rigid blades is achieved when the scraper blades effecting cleaning are inclined to the belt in the direction of movement thereof so as to make with the belt on the side of the blade where the belt moves towards such blade, an acute angle. The angle in the present specification will be referred to as the "angle of approach." In fact such an arrangement has been found to be clearly advantageous in practice.

A problem however exists where such inclination of the scraper blades to the belt surface is utilized where the conveyor belt can move rearwardly either deliberately or, for example, when an inclined conveyor is stopped and the hold back mechanism permits some rearward movement of the belt. In such circumstances the inclination of the blade as aforesaid to the conveyor belt surface is undesirable and in fact could cause damage to either the belt or the scraper blade and blade holding assembly.

It is the object of this invention to provide a conveyor belt cleaner and scraper blade for use in combination therewith wherein the advantageous inclination of the scraper blades to the conveyor belt surface can be utilized even though the conveyor belt surface itself may, under certain circumstances, move rearwardly relative to the scraper blades.

In accordance with this invention there is provided a conveyor belt cleaner comprising at least one scraper blade adapted to clean the surface of a conveyor belt as a result of its being urged towards said conveyor belt surface, the conveyor belt cleaner being characterised in that the scraper blade extends transversely with respect to the belt and is rotatable about an effective axis extending transversely with respect to the belt so that the scraper blade can assume either of two terminal positions in both of which the "angle of approach" is an acute angle.

Further features of the invention provide for the effective pivotal axis to be formed by providing on the scraper blade an effective socket extending along the length thereof and which co-operates with a blade-like support member which extends into the socket in the operative position and wherein the socket and blade-like support are dimensioned such that the scraper blade can be rocked back and forth about an effective axis to assume the two terminal positions defined above; and for the scraper blade to be of a rigid type conveniently having tungsten carbide inserts on its operative edge.

In the alternative the scraper blade could actually be pivotted to the blade support so that it can rotate about the pivotal axis between two terminal positions in which it is inclined to the belt surface in use as above defined.

The invention also provides a conveyor belt scraper blade having one or more sockets on its edge opposite the operative edge thereof so as to be capable of co-operating, in the above-defined manner, with one or more blade-like supports therefor on a conveyor belt cleaner.

In order that the invention may be more fully understood one embodiment thereof will now be described with reference to the accompanying drawings in which:

FIG. 1 is a schematic view of a conveyor belt cleaning device in use,

FIG. 2 illustrates in cross-section the mounting of a scraper blade on a blade support therefor, and, FIG. 3 illustrates in isometric view the conveyor belt scraper blade and its associated blade-like support in exploded view.

The invention is applicable to any type of conveyor belt cleaning device of the type wherein a blade is urged towards a conveyor belt surface to be cleaned. The urging may be effected by counter-weights, springs, or any other suitable means and the embodiment illustrated in FIG. 1 is only intended to be illustrative of the application of the invention but not limiting thereto.

As shown in FIG. 1 a conveyor belt cleaner comprises four conveyor belt scraper blades 1 arranged to extend at right angles to the length of a conveyor belt 2 and arranged so that the end regions overlap and thereby the scraper blades effectively cover the entire width of the conveyor belt.

In this particular embodiment of the invention each of the scraper blades is mounted on a blade support or carrier 3 thereof which in turn is rotatably mounted on an arm 4 (the axis of the latter rotation is substantially parallel to the length of the conveyor belt) carried by a rotatable sleeve or shaft 5 or 6 respectively. The sleeves and shafts 5 and 6 are independently biased so that the blades are urged towards the conveyor belt surface and the biasing is in this case effected by means of arms 7 and associated counter-weights 8. The shafts and sleeves are located on the sides of the scraper blades from which the dirty conveyor belt surface approaches the blades.

In this embodiment of the invention the blade carriers 3 are each of a blade-like configuration as shown clearly in FIGS. 2 and 3 such that the upper edge 9 thereof simply enters a socket 10 provided at the underside of a blade 11. The socket is simply an elongated rectangular socket which is dimensioned so as to be oversize to a predetermined extent to enable the blade to rock backwards and forwards on the blade carrier to the desired extent. Preferably the blade in its operative position makes an angle of approach of about 80° with the surface of the belt in use. It will be understood that the blade will automatically assume the correct angular position relative to the belt surface as a result of the frictional engagement of the operative edge 11 of the blade with the conveyor belt surface. Thus when the belt is reversed the conveyor belt scraper blade may rotate from a position illustrated in FIG. 2 in full lines to the position illustrated in dotted lines 12. It will be understood that this feature enables the advantageous characteristics of the inclination of a scraper blade relative to a conveyor belt surface being cleaned to be utilized even in the case of reversible conveyor belts as well as in cases where a small amount of rearward movement of a conveyor belt is experienced as a result of an inclined conveyor having a holdback mechanism which permits limited rearward movement of the belt, or the conveyor belt stretching or any fault of the equipment without the blade holding arrangement, or conveyor belt becoming damaged.

It will be understood that numerous variations may be made to the above described embodiment of the invention without departing from the scope hereof. In particular the blade could be attached to the blade carrier by means of pins or other fasteners as may be required and such fasteners may also be adapted to allow the articulated rotational movement described above to take place. Alternatively, the scraper blades could be pivotally mounted on their carriers in which case suitable stop arrangements would be utilized to ensure that only the desired amount of rotational movement is permitted.

It is also to be mentioned that while the above described embodiment is stated as requiring the blade to be preferably at 80° to the surface of a belt being cleaned, the invention is in absolutely no way limited to such an angle of inclination. In fact it is considered that 70° would be adequate and the actual inclination may be somewhat less, in which case the scraper blade could make an angle of approach of 85° or even 87° with the surface of the conveyor belt being cleaned.

It is considered that a conveyor belt cleaner as provided by this invention will be advantageous in use and, in among other advantages provided by the invention, a great simplicity in changing conveyor belt scraper blades is provided since the old ones need only be lifted off the blade carrier and the new ones installed thereon without any fasteners being required to be removed and replaced.

I claim:

1. A conveyor belt cleaner comprising at least one scraper blade adapted to clean the surface of a conveyor belt as a result of its being urged towards said conveyor belt surface, the conveyor belt being characterized in that the scraper blade extends transversely with respect to the belt and is rotatable about an effecive axis extending transversely with respect to the belt so that the scraper blade can assume either of two terminal positions in both of which the angle of approach is an acute angle and the scraper blade contacts the belt, said axis being formed by providing on the scraper blade at least one socket on its length which cooperates with a blade-like support, said socket having a larger interior dimension than the exterior dimension of said support to provide a loose coupling of the two such that said axis is positioned within and extends along the length of said socket to allow the opposite edge of said scraper blade to be rocked back and forth about said axis to assume one of said terminal positions.

2. A conveyor belt cleaner as claimed in claim 1 in which the scraper blade is substantially rigid.

3. A conveyor belt cleaner as claimed in claim 1 in which a plurality of scraper blades are arranged to extend across at least the major portion of the width of the conveyor belt with their justaposed ends in overlapping relationship.

4. A conveyor belt cleaner as claimed in claim 1 in which the angle of inclination of the scraper blade to the conveyor belt in each of the two terminal positions is between 70° and 87°.

5. A conveyor belt cleaner as claimed in claim 6 in which the angle of inclination is between 78° and 82°.

6. A conveyor belt cleaner as claimed in claim 1 in which a single socket extends along substantially the entire length of the blade.

7. A conveyor belt cleaner comprising:
a pivotably mounted arm extending generally parallel to the direction of conveyor movement;
an elongated blade carrier fixedly secured to said arm, extending generally perpendicular to the conveyor belt and having a distal side edge extending toward the conveyor belt;
an elongated belt scraper having one edge contacting the belt and a socket means on an opposite edge pivotably coupling the scraper to said distal side edge, said socket means having an internal dimension larger than the external dimension of said distal side edge to provide a loose fit between the two so that said scraper can pivot about an axis extending within and along the length of said socket means, with a limited degree of freedom, to assume either of two terminal positions, in both of which the angle of approach to the belt is an acute angle and the scraper blade contacts the belt; and,
means for biassing said arm toward said belt to engage said belt scraper and belt.

* * * * *